(12) United States Patent
Wilcox

(10) Patent No.: US 7,665,749 B2
(45) Date of Patent: Feb. 23, 2010

(54) SUSPENSION ASSEMBLY HAVING AN INTEGRATED STABLE STORAGE PLATFORM

(76) Inventor: Joseph Wilcox, 793 Cereza Dr., Palo Alto, CA (US) 94306

( * ) Notice: Subject to any disclaimer, the term of this patent is extended or adjusted under 35 U.S.C. 154(b) by 0 days.

(21) Appl. No.: 12/052,210

(22) Filed: Mar. 20, 2008

(65) Prior Publication Data

US 2008/0258416 A1 Oct. 23, 2008

Related U.S. Application Data

(63) Continuation of application No. 60/912,230, filed on Apr. 17, 2007.

(51) Int. Cl.
*B60G 21/00* (2006.01)
(52) U.S. Cl. .................. 280/124.103; 280/124.111; 280/124.134; 280/6.154
(58) Field of Classification Search .......... 280/124.103, 280/124.111, 124.11, 124.134, 124.135, 280/124.136, 5.508, 6.154
See application file for complete search history.

(56) References Cited

U.S. PATENT DOCUMENTS

| | | | | |
|---|---|---|---|---|
| 3,561,778 A | * | 2/1971 | La Brie | 280/7.14 |
| 3,572,456 A | * | 3/1971 | Healy | 180/217 |
| 3,964,563 A | | 6/1976 | Allen | |
| 4,088,199 A | * | 5/1978 | Trautwein | 180/209 |
| 4,325,565 A | | 4/1982 | Winchell | |
| 4,469,344 A | | 9/1984 | Coil | |
| 4,546,997 A | * | 10/1985 | Smyers | 280/5.509 |
| 4,685,690 A | * | 8/1987 | Fujita et al. | 280/124.103 |
| 4,740,004 A | | 4/1988 | McMullen | |
| 5,040,812 A | * | 8/1991 | Patin | 280/62 |
| 5,762,351 A | * | 6/1998 | SooHoo | 280/267 |
| 5,765,846 A | | 6/1998 | Braun | |
| 6,022,036 A | * | 2/2000 | Chartrand | 280/209 |
| 6,203,043 B1 | * | 3/2001 | Lehman | 280/288.1 |
| 6,250,649 B1 | | 6/2001 | Braun | |
| 6,382,646 B1 | * | 5/2002 | Shaw | 280/87.041 |
| 6,763,905 B2 | | 7/2004 | Cocco et al. | |
| 7,108,097 B1 | | 9/2006 | Bolton et al. | |
| 7,172,045 B2 | | 2/2007 | Takayanagi et al. | |
| 7,467,802 B2 | * | 12/2008 | Peng et al. | 280/124.103 |
| 7,487,985 B1 | * | 2/2009 | Mighell | 280/124.103 |
| 2007/0151780 A1 | * | 7/2007 | Tonoli et al. | 180/65.1 |

OTHER PUBLICATIONS

Riley, Robert Q., "Three Wheel Cars-Primary Factors that Determine Handling & Rollover Characteristics", Robert Q. Riley Enterprises, LLC, 1999-2007.

* cited by examiner

*Primary Examiner*—Toan C To
(74) *Attorney, Agent, or Firm*—Barlow, Josephs & Holmes, Ltd.

(57) ABSTRACT

A suspension system for a vehicle is provided that allows for the vehicle body to be tilted wherein the tilt is controlled by the operator's legs in a manner that greatly enhances the stability of the vehicle while producing a fun vehicle to operate. Further, the bottom member of the suspension system is structured in a manner that provides storage capacity for installation of heavy items such as battery banks in order to preserve a lowered center of gravity for the vehicle. The tilting suspension may be used in the context of three-wheeled vehicle having a single rear drive tire and two forward wheels, but apply equally to a four wheeled vehicle as well as to water craft operating on pontoons or snow vehicles operating on skis.

17 Claims, 12 Drawing Sheets

SUSPENSION ASSEMBLY HAVING AN INTEGRATED STABLE STORAGE PLATFORM

CROSS-REFERENCE TO RELATED APPLICATIONS

This application is related to and claims priority from earlier filed U.S. Provisional Patent Application No. 60/912,230, filed Apr. 17, 2007.

BACKGROUND OF THE INVENTION

The present invention relates to generally to a suspension system for tilting vehicles. More specifically, the present invention relates to an active suspension for a tilting vehicle that expands upon the four-bar principal by extending the lower suspension linkage to create a large storage platform that allows heavy objects, such as battery banks, to be installed into the vehicle while preserving a lowered center of gravity.

Currently, most of the motor vehicles that are on the highways are four-wheeled vehicles that tend to be larger, heavier and, as a result less, fuel-efficient than three-wheeled motor vehicles. Despite the fact that four-wheeled vehicles can be seen to enjoy more widespread use and acceptance, there are several advantages that are provided by modern three-wheeled vehicles. For example, under most circumstances three-wheel vehicles are, by their nature, more stable than four-wheel vehicles due to the fact that three contact points will form a plane under all circumstances, whereas four contact points will not. Another advantage is that three-wheel vehicles afford a nearly ideal wheel loading distribution for maximum tire traction in both acceleration and braking situations. Despite the advantages that three-wheeled vehicles enjoy over four-wheel vehicles, the main drawback of a three-wheel vehicle is that during a turn, rather than having two outside wheels in contact with the road surface, the three-wheeled vehicle only has a single outside wheel that must bear the entire centrifugal load generated by the vehicle while negotiating the turn. In this regard, the centrifugal force tends to overload the outside tire causing the vehicle to slip out of the direction of the turn unless some additional means of force compensation is provided. Further, the three-wheeled vehicle geometry allows the force vector associated with the vehicle's center of gravity to quickly fall outside the wheelbase of the vehicle causing an unstable condition and increasing the possibility of overturning the vehicle. To make this condition worse, as the center of gravity of the vehicle (including an operator and any load being carried by the vehicle) raises higher, the potential for vehicle instability and overturning becomes much greater. In order to counteract these forces, generally three-wheeled vehicles often employ a tilting and banking mechanism that shifts the vehicle's center of gravity toward the inside as it negotiates a turn thereby keeping more of the centrifugal load over the inside tire.

One prior art approach used in solving this problem was to utilize a pair of small spaced-apart wheels with a tilting frame. In this arrangement, the wheels remained substantially vertically inclined while only the vehicle frame leaned into turns. The problem is that such a construction is somewhat self-defeating in that it lacks the ability to tilt and bank in a manner that directs the traction forces through the center of gravity of the vehicle and the point of contact of the vehicle wheels with the ground. Alternatively, hydraulic cylinder load-leveling systems have been devised, however, these systems quickly become complex and require a fair amount of electronics and computing power to generate sufficient control in order to obtain optimal response.

The ability to overcome the aforementioned handling problems in three-wheeled vehicles becomes even more important as more emphasis is placed upon alternative fuel and/or hybrid vehicles. While the improved efficiencies typically realized by three-wheeled frame geometries would be highly advantageous in connection with alternative fuel systems, often such systems require large battery banks to store sufficient battery capacity to produce a useful range. Further, the chemistry of these batteries requires that they employ some form of heavy metal therein. As the size of the batteries and the number of batteries in a given battery bank increases, the weight that is required to be carried within the vehicle also greatly increases. The problem is further aggravated by that fact that most prior art solutions provided for installing these batteries in a vertical location somewhere beneath the vehicle seat. Further, all of these solutions place the batteries in a vertical stacked arrangement that places their significant weight relatively high in the vehicle platform. As a result, such battery placement greatly raises the height of the vehicle's center of gravity thereby adding to the stability issues raised above.

Accordingly, there is a need for a suspension system for a tilting vehicle that allows the forces generated by the vehicle to be transferred using a center of effort that is directed perpendicular to the traction surfaces of the tires. Further, there is a need for a suspension system for a tilting vehicle that provides a storage position at the lowest possible position within the vehicle for storage of heavy items such as large battery banks. Finally, there is a need for a suspension system for a tilting vehicle that both facilitates a low center of gravity arrangement by placing heavy load storage in a lowered position while also still allowing active tilt control by the vehicle operator in a manner that greatly reduces the complexity of the system and the need for multiple sensors, hydraulic arrays and substantial computer power.

BRIEF SUMMARY OF THE INVENTION

In this regard, the present invention provides a suspension system for a wheeled vehicle is provided that allows for the vehicle body to be tilted by the operator in a manner that greatly enhances the stability of the vehicle while producing a fun vehicle to operate. Further, the bottom member of the suspension system is structured in a manner that provides storage capacity for installation of heavy items such as battery banks in order to preserve a lowered center of gravity for the vehicle. In the preferred embodiment, the present invention will be described in the context of a three-wheeled vehicle having a single rear drive tire and two forward wheels, although it should be appreciated by one skilled in the art that the teachings of the present invention apply equally to a four wheeled vehicle as will be described in further detail below as well as to water craft operating on pontoons or snow vehicles operating on skis.

The basic principal of the present invention is to provide a pivoting vehicle wherein a vertical axis of the vehicle and a vertical set of axes running through each of two spaced tires remains parallel as the vehicle tilts and wherein the user's legs control the tilt of the vehicle. It should be appreciated that a number of mechanical methods exist that provide this desired result. The important inventive concept is that the chassis is connected to at least two wheels that tilt as the chassis tilts so that these elements remain in their parallel orientation and that the control of the tilt of the chassis is accomplished through the use of the riders legs directly on the linkage itself.

Further, to enhance the stability of the vehicle the bottom suspension member is expanded to include storage therein for placement of heavy load items.

The present invention is implemented preferably using a four bar suspension. The four bars that make up the suspension are arranged in a parallelogram shape wherein two suspension members are parallel to one another along the top and bottom of the suspension arrangement and two bars are substantially parallel to one another along the left and right sides of the suspension arrangement. The ends of each of the suspension members are pivotally attached to one another to form a hinged parallelogram. The hinged parallelogram is then affixed to the chassis of the vehicle by pivotally attaching both the top and bottom bars to the vehicle chassis at approximately their mid points. The bottom suspension member preferably includes a structural strut that extends between the left and right vertical bars while further extending rearward from the strut and including a storage compartment therein. In this manner, the storage compartment provides a location for the placement of batteries that power the vehicle in a relatively low position within the vehicle to enhance the stability and lower the center of gravity. In particular, since the bottom platform does not tilt as it is affixed to the bottom bar of the suspension the weight of the batteries is removed from the tilting aspects of the linkage. As a result the tilting mass remains light and nimble. This allows the vehicle to have lightweight handling response and overall feel while still carrying a substantial battery load.

Accordingly, it is an object of the present invention to provide a suspension system for a tilting vehicle that allows the forces generated by the vehicle to be transferred using a center of effort that is directed perpendicular to the traction surfaces of the tires. Further, it is an object of the present invention to provide a suspension system for a tilting vehicle that provides a storage position at the lowest possible position within the vehicle for storage of heavy items such as large battery banks thereby lowering the center of gravity of the vehicle while also removing the weight of the load from the tilting assembly. Finally, it is an object of the present invention to provide a suspension system for a tilting vehicle that both facilitates a low center of gravity arrangement by placing heavy load storage in a lowered position while also still allowing active tilt control by the vehicle operator in a manner that greatly reduces the complexity of the system and the need for multiple sensors, hydraulic arrays and substantial computer power.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 9:
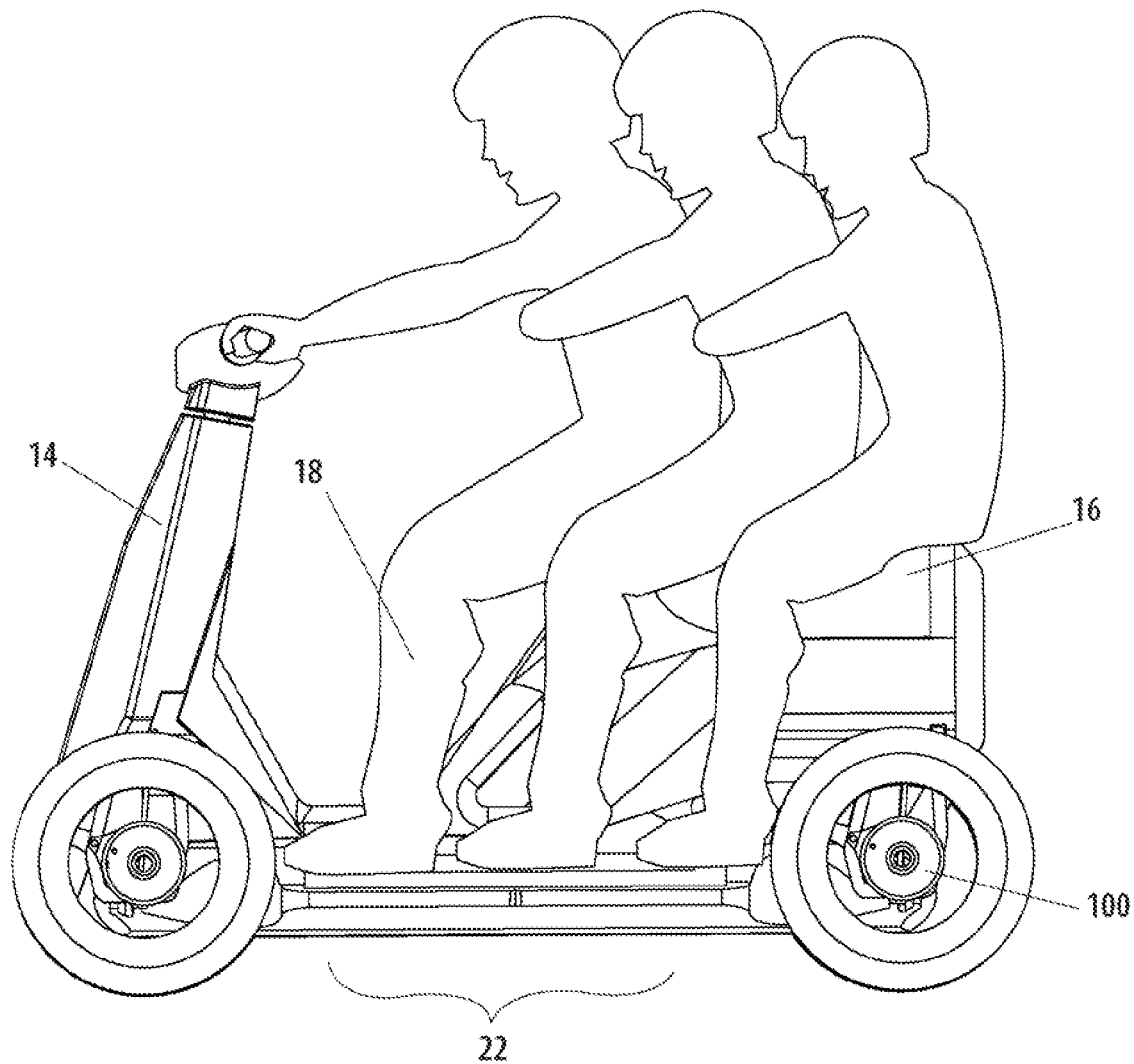
FIG. 9 is side view of the vehicle of FIG. 7 equipped to carry multiple riders.
Figure 10:
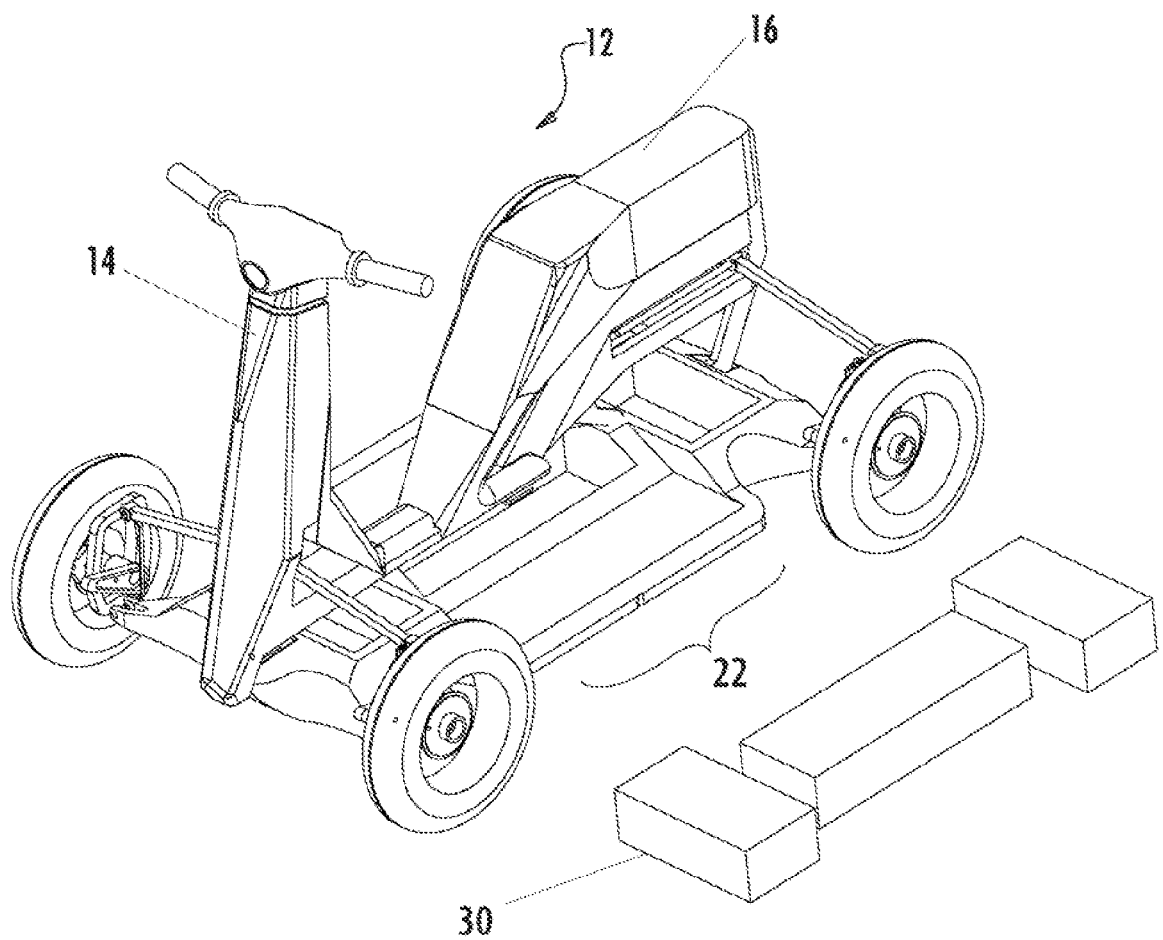
FIG. 10 is a perspective view of the vehicle of FIG. 7 with the batteries removed from the storage compartment.
Figure 11:
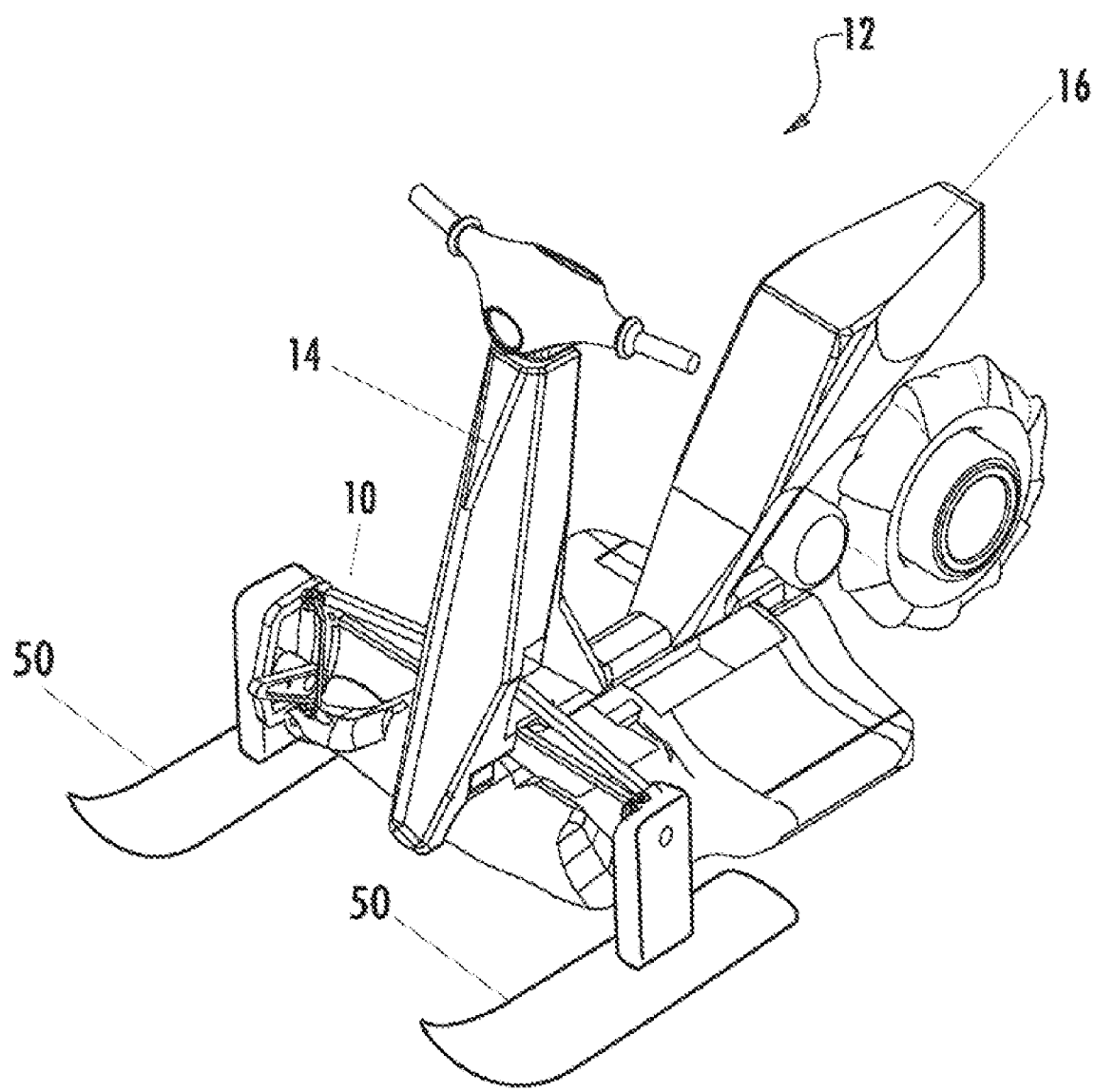
FIG. 11 is a front view of the suspension assembly of the present invention in connection with skis.
Figure 12:
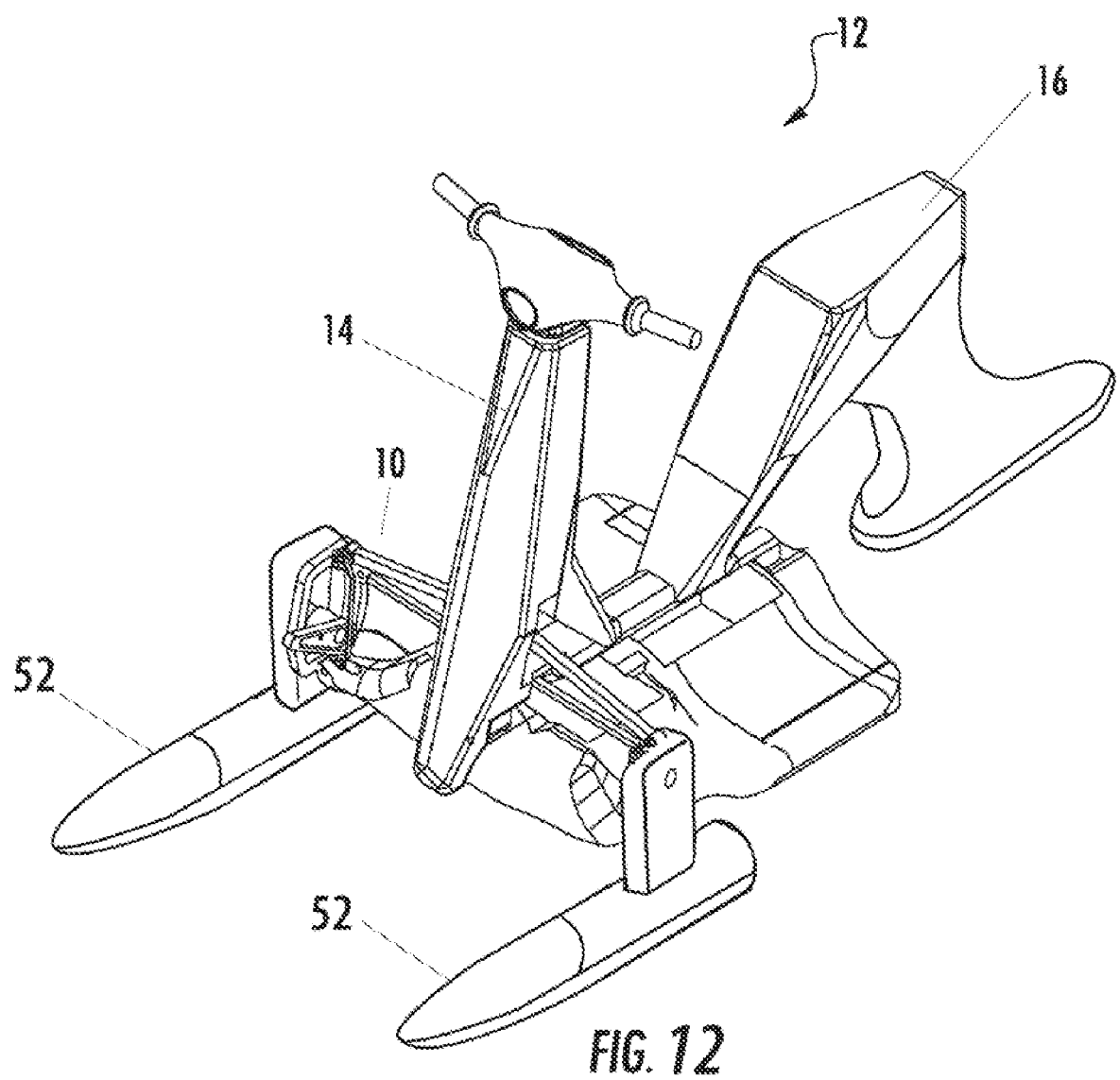
FIG. 12 is a front view of the suspension assembly of the present invention in connection with pontoons.

Now referring to the drawings, the suspension assembly for a tilting vehicle is shown and generally illustrated in the figures. FIGS. 1-5 depict the suspension assembly 10 as being installed at the front of a three-wheeled tilting vehicle. FIG. 6 depicts the suspension assembly 10 positioned at the rear of a vehicle. FIGS. 7-10 depict a vehicle that employs the suspension assembly 10 of the present invention both in the front and rear in a four-wheeled arrangement and an elongated configuration designed to carry multiple passengers. Finally, FIGS. 11 and 12 depict wheel alternatives such as skis and pontoons to allow the vehicle to travel on snow or water.

As can be seen in FIGS. 1-4, the suspension system 10 of the present invention is depicted on a tilting vehicle 12 that is in an upright and a tilted position and is depicted in the context of a wheeled vehicle. In general terms, the suspension assembly 10 of the present invention includes a central frame 14 having a front, a rear and a support means 16 for a rider 18. The front suspension assembly 10 can be seen attached to the front of the central frame 14 at pivots 19. The front suspension assembly 10 includes a top suspension bar 20 and a bottom suspension bar 22 each of which has a respective left end and right end. Further, the suspension assembly 10 includes a left suspension bar 24 and a right suspension bar 26 each having a respect top and bottom ends. The geometry of the suspension assembly 10 is arranged such that the left ends of the top and bottom suspension bars 20, 22 are pivotally attached to the respective top and bottom ends of the left suspension bar 24 and the right ends of the top and bottom suspension bars 20, 22 are pivotally attached to the respective top and bottom ends of the right suspension bar 26 at pivots 17 such that said top and bottom suspension bars 20, 22 are substantially parallel to one another and said left and right suspension bars 24, 26 are substantially parallel to one another. It can also be seen that a central portion of the top and bottom suspension bars 20, 22 are pivotally affixed to the front of the central frame 14. As described above, the geometry of the suspension assembly 10 of the present invention is implemented preferably using a four bar suspension. The four suspension bars 20, 22, 24, 26 that make up the suspension 10 are arranged in a parallelogram shape wherein top and bottom suspension bars 20, 22 are substantially parallel along the top and bottom of the suspension assembly 10 and the left and right suspension bars 24, 26 are substantially parallel to one another along the left and right sides of the suspension assembly 10. The ends of each of the suspension bars 20, 22, 24, 26 are pivotally attached to one another to form a hinged parallelogram.

Further, it can be seen that the bottom suspension bar 22 is enlarged in depth and extended rearwardly to form a storage compartment 28 that provides storage capacity for installation of heavy items such as battery banks 30 in order to preserve a lowered center of gravity for the vehicle 12. In this manner, the storage compartment 28 provides a location for the placement of batteries 30 that power the vehicle 12 in a relatively low position within the vehicle 12 to enhance the stability and lower the center of gravity. In particular, since the bottom suspension bar 22 does not tilt relative to the central frame 14 the weight of the batteries 30 is removed from the tilting aspects of the suspension assembly 10. As a result the tilting mass of the vehicle 12 remains light and nimble. This allows the vehicle 12 to have lightweight handling response and overall feel while still carrying a substantial battery load.

The basic principal of the present invention is to provide a pivoting vehicle 12 wherein a vertical axis 32 of the central frame 14 and a vertical set of axes 34, 36 running through each of two spaced tires 38,40 remains parallel as the vehicle 12 tilts and wherein the user's 18 legs 42 control the tilt of the vehicle 12. It should be appreciated that a number of mechanical methods exist that provide this desired result. The important inventive concept is that the central frame 14 is connected to at least two wheels 38, 40 that tilt as the central frame 14 tilts so that these elements remain in their parallel orientation and that the control of the tilt of the central frame 14 is accomplished through the use of the rider's 18 legs 42 directly on either the top suspension bar 20 or more preferably the bottom suspension bar 22 of the suspension assembly 10 itself.

The arrangement of the present invention allows for the free leaning performance of a motorcycle without the need for a high level of traction between the tires and the travel surface in order for the vehicle to remain upright. As a result, the vehicle can be operated on snow, ice, dirt, etc. safely. Further, to enhance the stability of the vehicle 12 the bottom suspension bar 22 expanded to include the storage compartment 28 therein for placement of heavy load items.

Generally, travel surface interfaces, i.e. means that support the vehicle 12 for traveling over a surface 44 are affixed to the left and right suspension bars 24, 26 and to the rear of the central frame 14 to allow the vehicle 12 to be operated on the desired surface 44. In the preferred embodiment, the present invention is described in the context of a three-wheeled vehicle 12 having travel surface interfaces in the form of a single rear drive tire 46 and two forward wheels 38, 40, although it should be appreciated by one skilled in the art that the teachings of the present invention apply equally to a four wheeled vehicle as will be described in further detail below as well as to water craft operating on pontoons or snow vehicles operating on skis.

Figure 1:
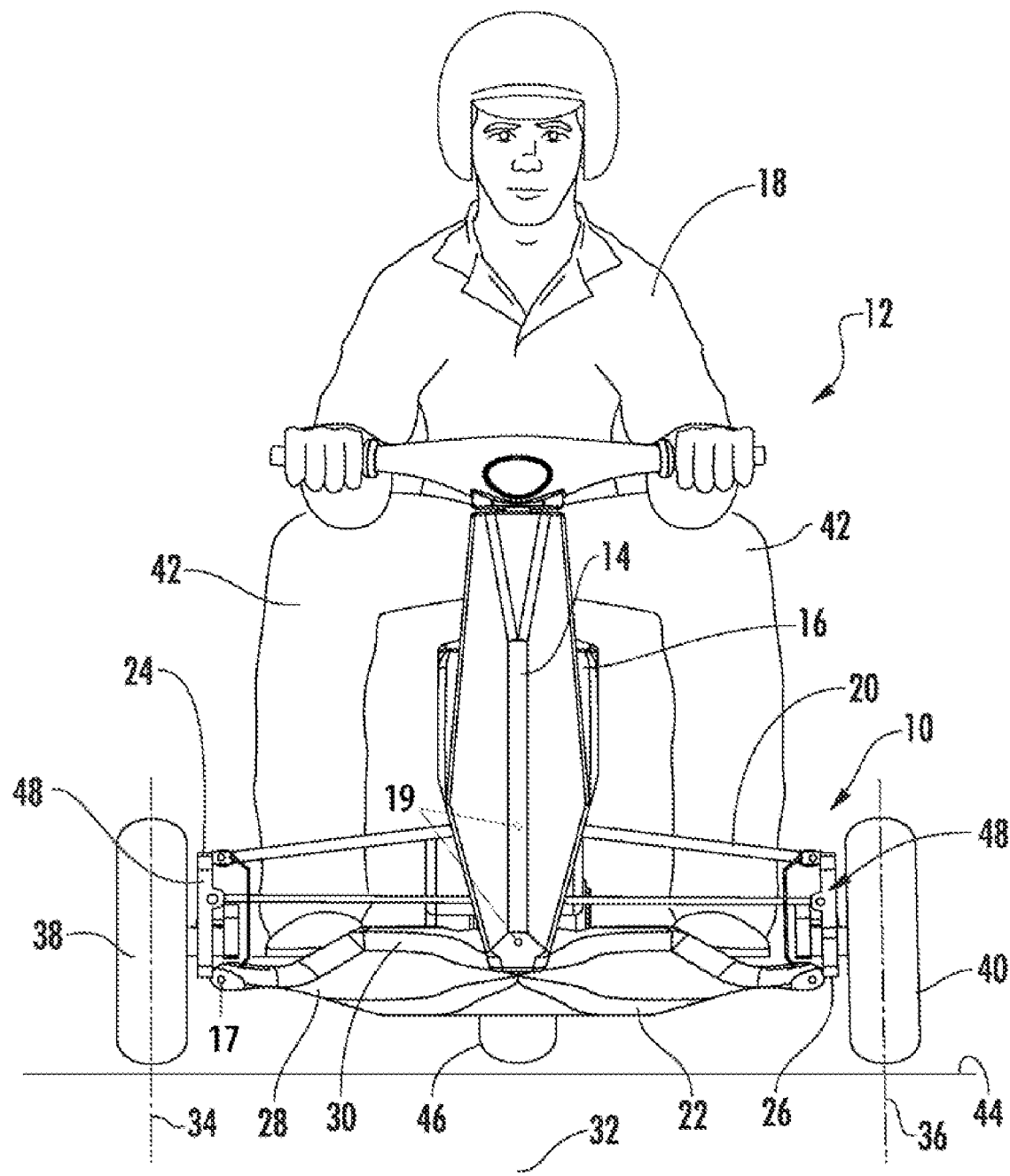
FIG. 1 is a front view of a vehicle equipped with the suspension system of the present invention wherein the vehicle is in a vertical position.
Figure 2:
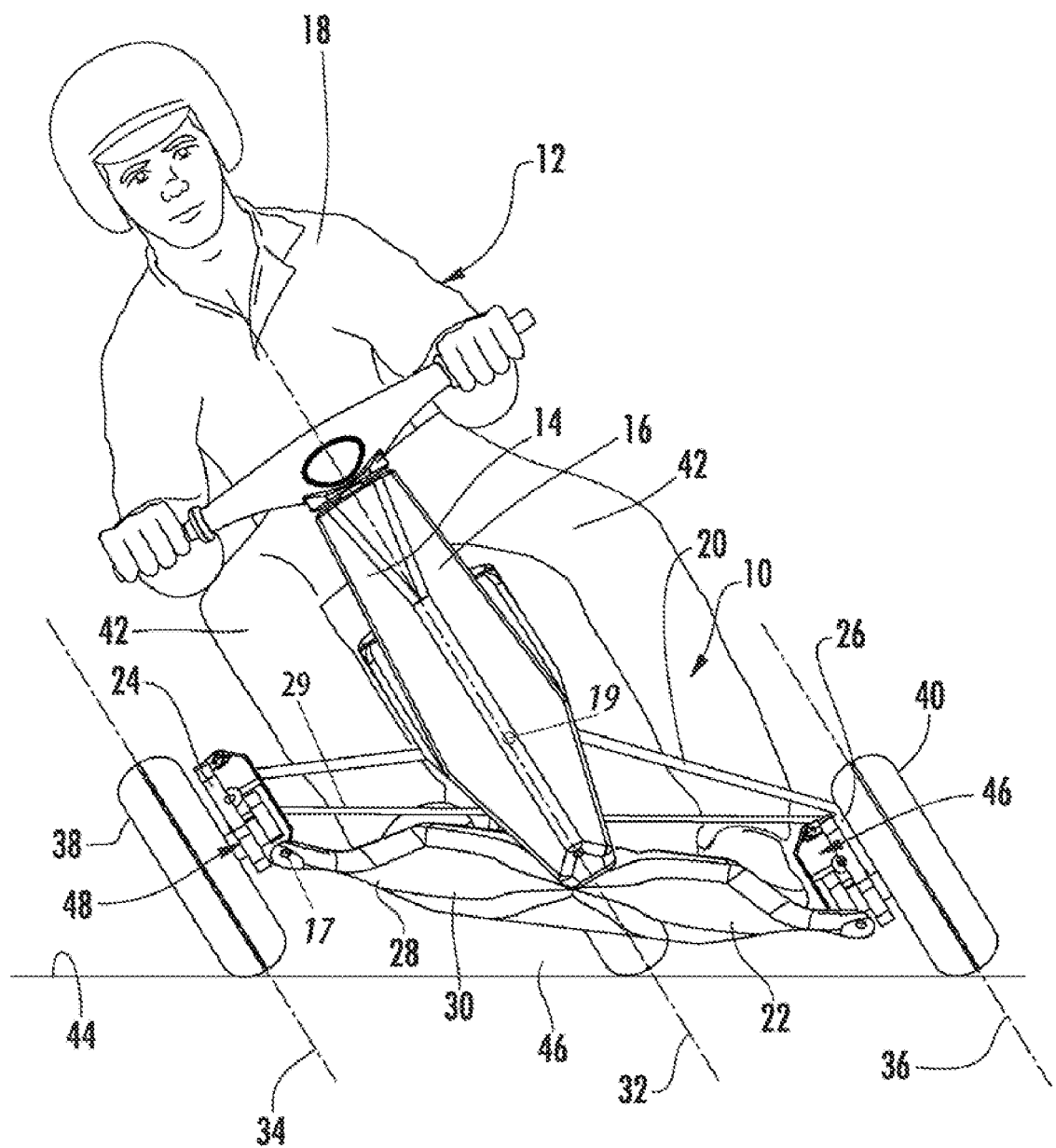
FIG. 2 is a front view of a vehicle equipped with the suspension system of the present invention wherein the vehicle is in a tilted position.
Figure 3:
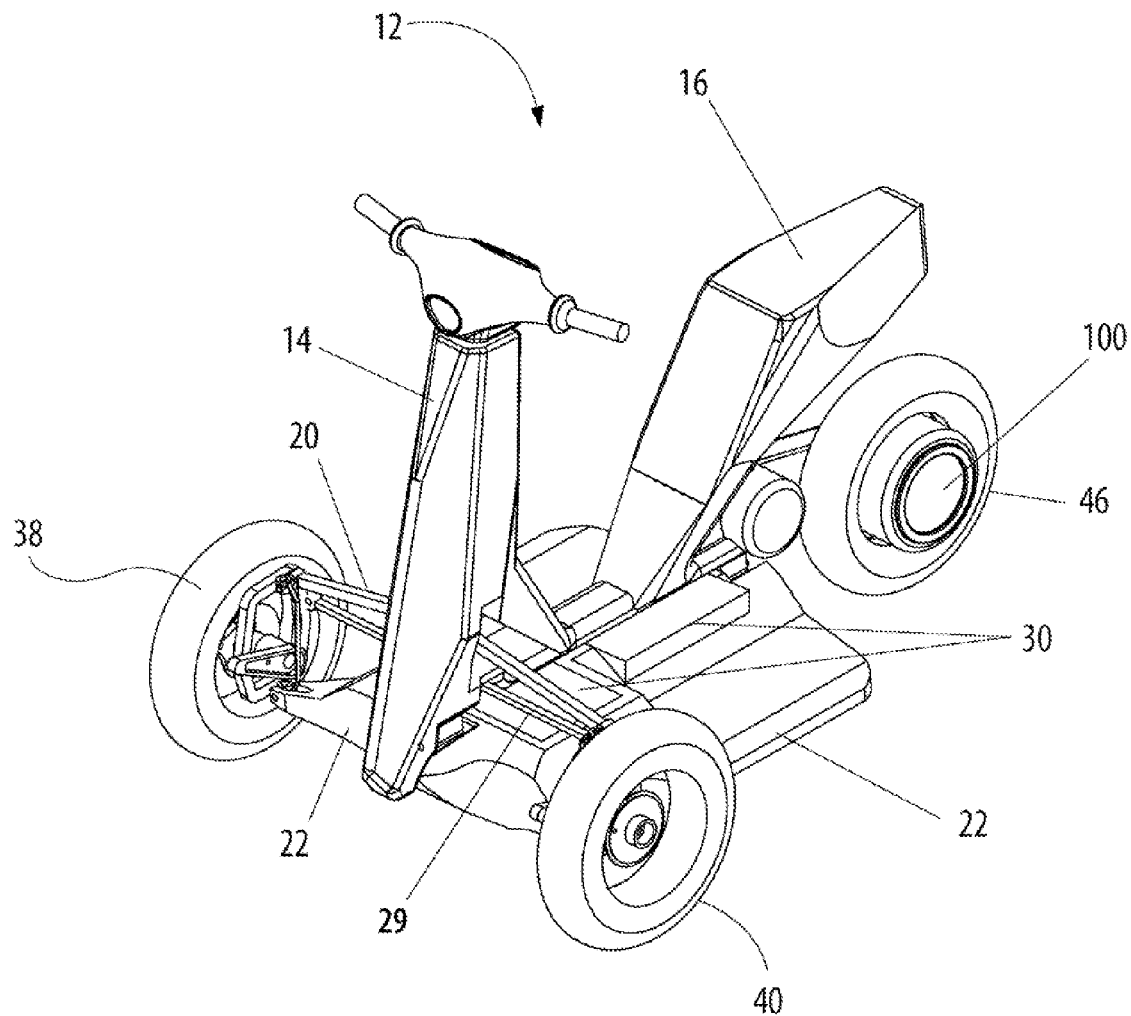
FIG. 3 is a front perspective view of a vehicle equipped with the suspension system of the present invention.
Figure 4:
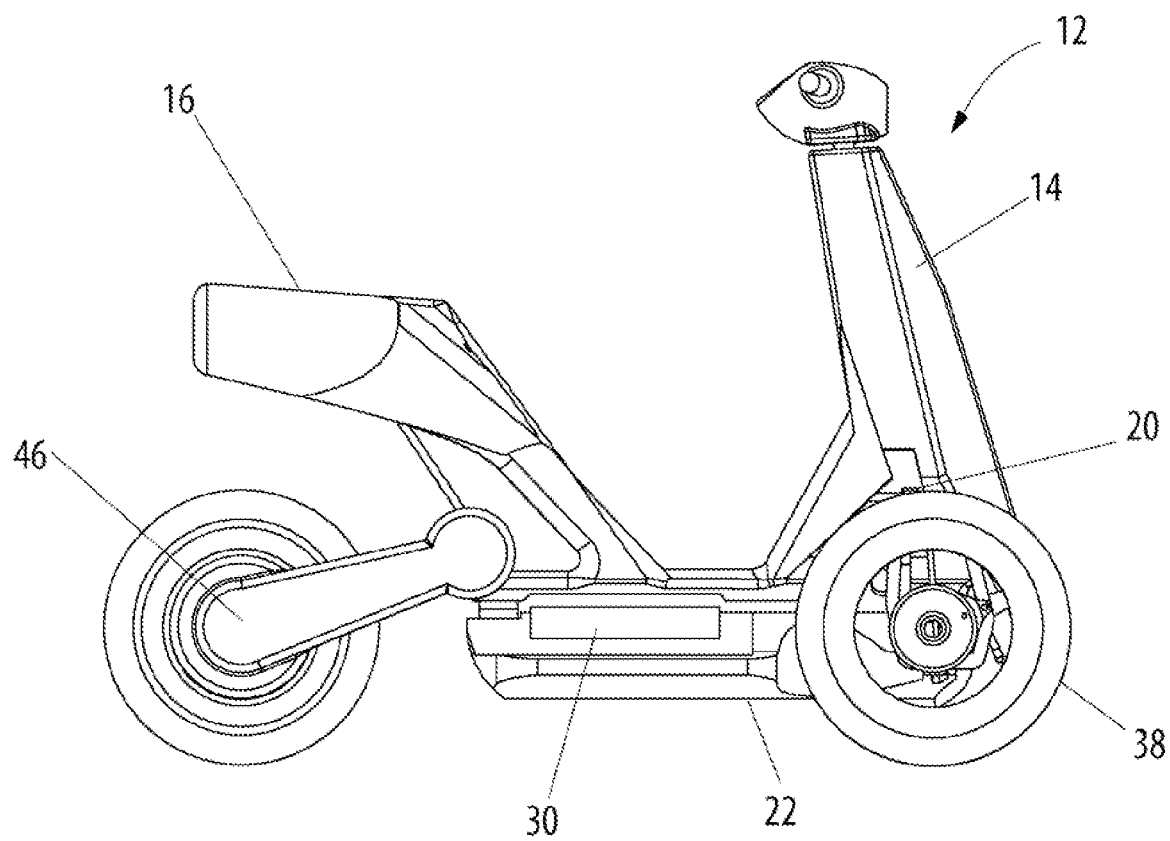
FIG. 4 is a side view of a vehicle equipped with the suspension system of the present invention.
Figure 5:
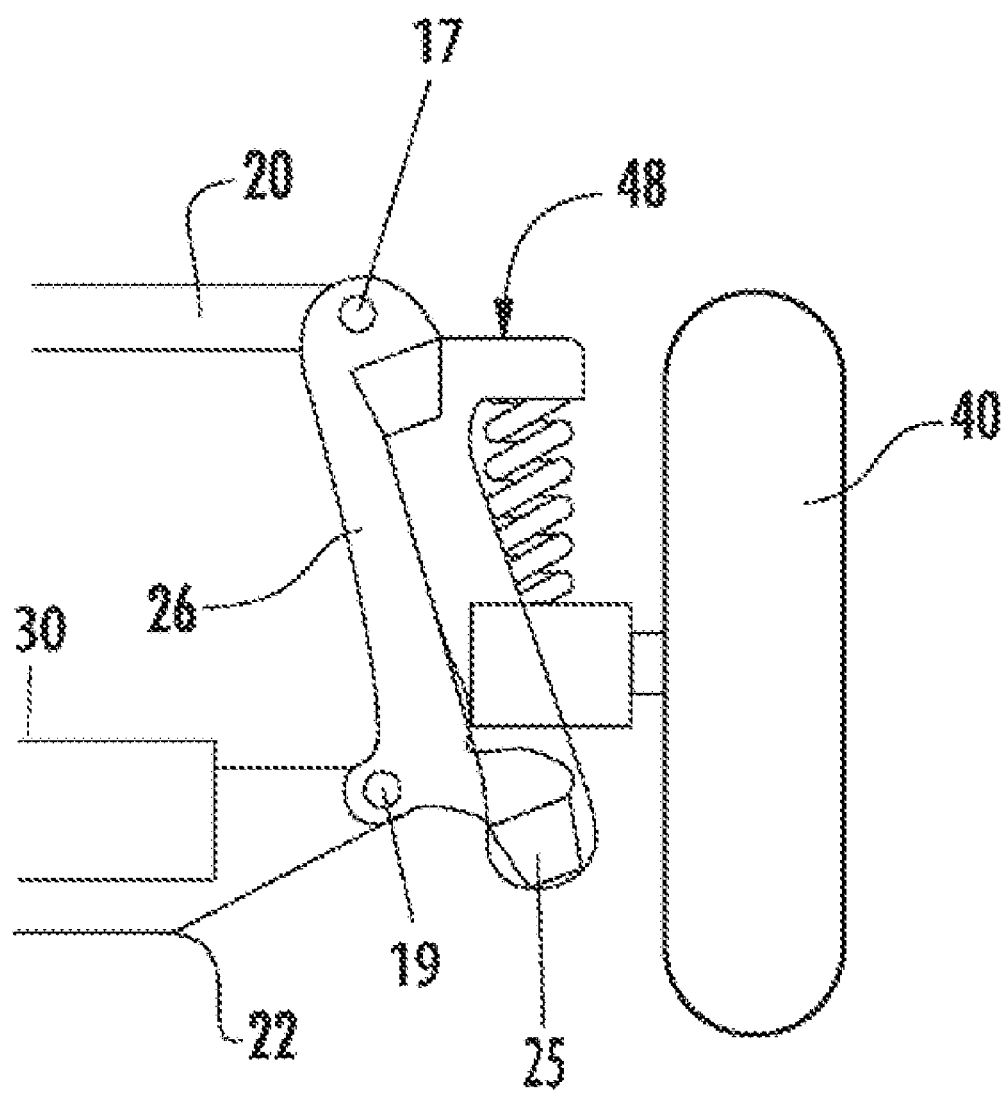
FIG. 5 is a detail view of one side of the suspension of the present invention.
Figure 6:
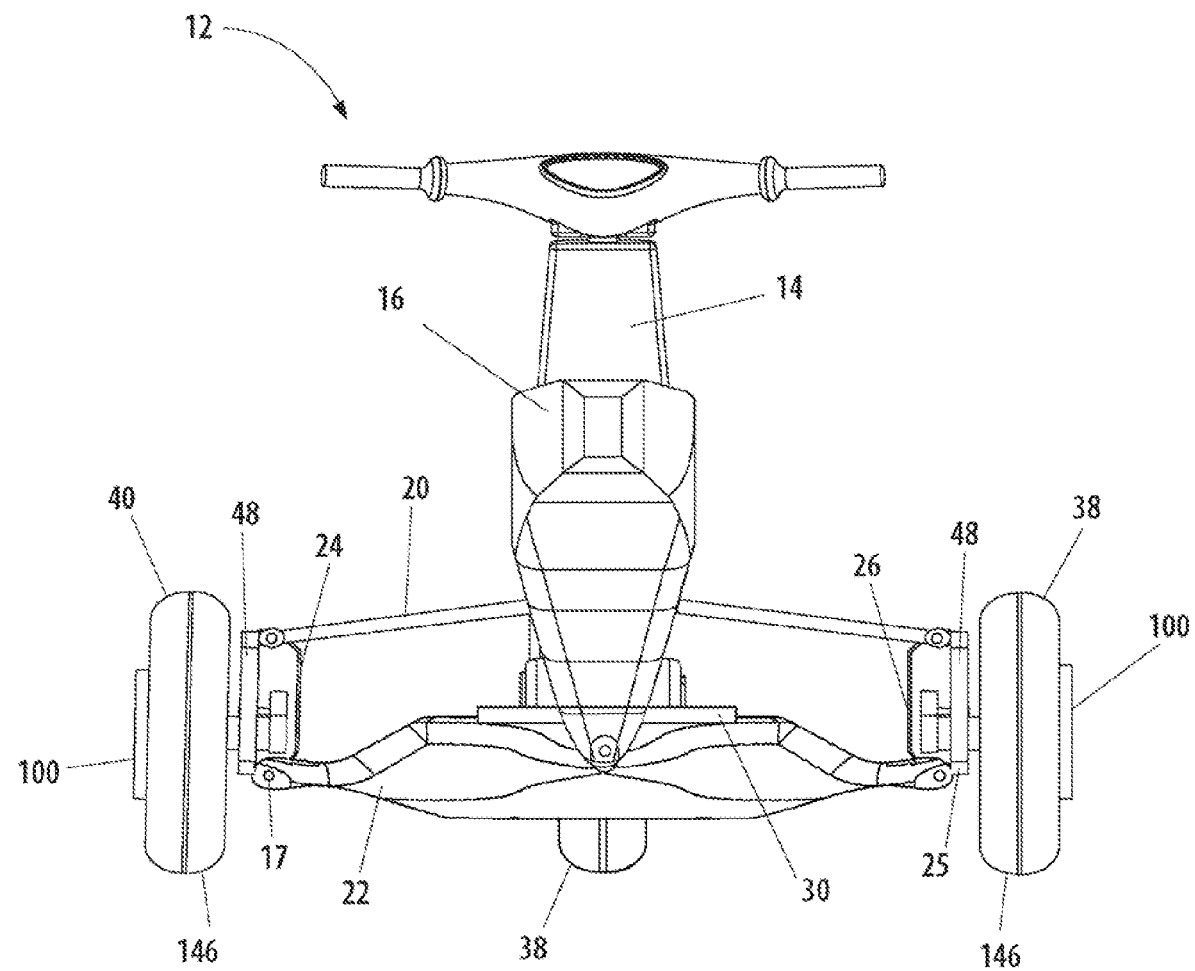
FIG. 6 is rear view of a vehicle with the suspension system of the present invention positioned in the rear.

Turning now to FIG. 5, is should be appreciated by one skilled in the art that in order to operate the vehicle 12, the suspension assembly 10 must also provide a means for turning either the front 38, 40 or rear 46 travel surface interfaces (wheels) to allow the vehicle 12 to corner. In the simplest form, the front wheels 38, 40 are mounted to spindles 48 that are pivotally affixed to the left and right suspension bars 24, 26 and connected tire rods 29. It can be appreciated that as the vehicle 12 is tilted, the spindles 48 and the two wheels 38, 40 mounted to the left and right suspension bars 24, 26 at pins 17 must also tilt to maintain the geometry of the parallelogram. In this respect, as the vehicle 12 is tilted the left and right wheels 38, 40 are also tilted and remain in parallel relation to the central frame 14. In addition however, the ability to pivot the wheel spindles 48 relative to the suspension assembly 10 on bearings 25 allows the wheels 38, 40 to be turned to allow the vehicle 12 to corner.

In the preferred embodiment, the present invention provides for installing the four bar suspension assembly 10 onto the front end of a motorized vehicle 12 such as a moped or motorcycle. In this manner, the rear wheel 46 serves as the drive wheel and the front wheel is replaced with the suspension assembly 10 and two front wheels 38, 40. In this configuration, the spindles 48 for the front wheels 38,40 are mounted to the left and right suspension bars 24, 26 in a manner that allows the spindles 48 and in turn the wheels 38, 40 to pivot around the axis of the left and right suspension bars 24, 26. Further, the two spindles 48 are interconnected utilizing an assembly that is well know in the steering art and includes a tie rod that is also connected to a steering linkage thereby allowing the user to steer the vehicle 12. To further assist in stabilizing the vehicle 12, the front wheels 38, 40 may have at least a small amount of caster to the rear of the suspension assembly 10 to facilitate self centering of the steering and a slight amount of camber to urge the vehicle 12 to a normal upright position. It should be further appreciated that the present invention can be employed in an OEM type construction or may be created as a retrofit kit for installation onto existing vehicles.

Turning now to FIG. 6, one skilled in the art should also appreciate that the four-bar suspension 10 of the present invention may be utilized at the rear of the central frame 14 in place of the rear tire 46. In all aspects this configuration will operate the same as described above while simply being relocated to the rear of the vehicle 12. In this arrangement, the rear wheels 146 may be the drive wheels powered by electric hub motors 100 or the turning wheels. Similarly, the front wheel 138 may be the drive or turning wheel. Further, one four bar suspension assembly 110 may be positioned at the front of the central frame 14 while a second four-bar suspension assembly 210 may be positioned at the rear of the central frame 14 to form a four-wheel configuration as depicted in FIGS. 7-10.

Figure 7:
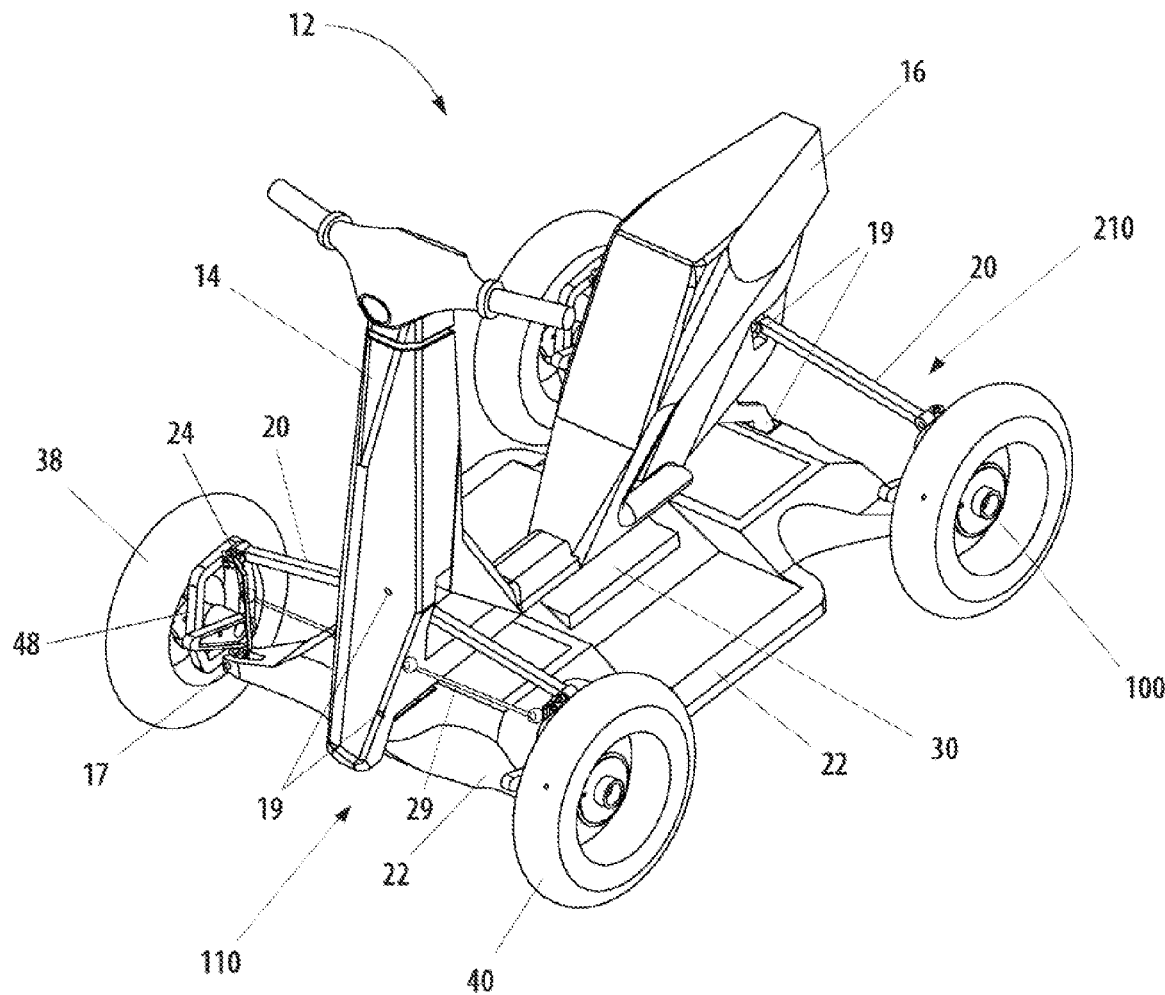
FIG. 7 is perspective view of a vehicle with the suspension system of the present invention positioned both in the front and rear.
Figure 8:
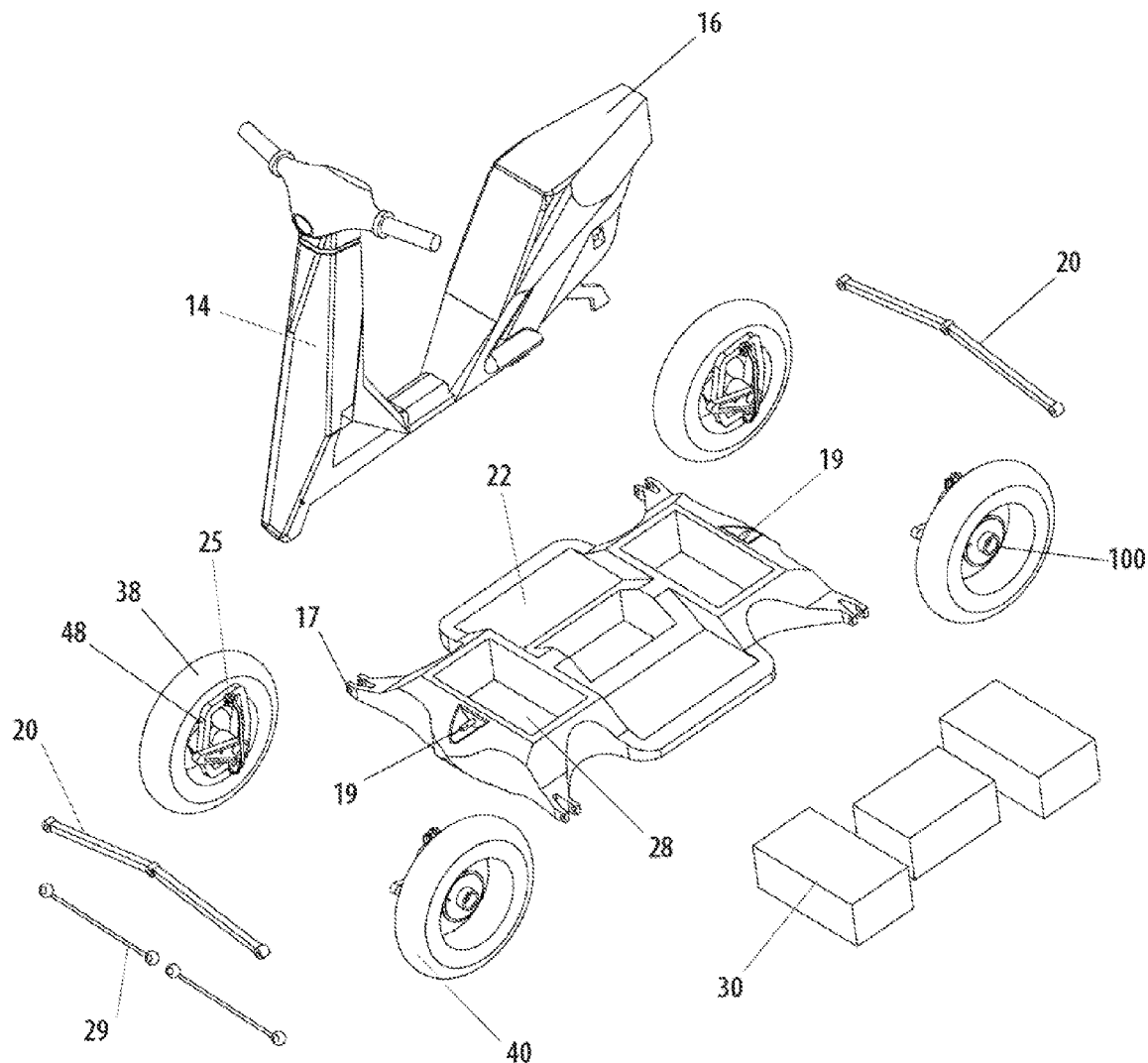
FIG. 8 is an exploded perspective view of the vehicle of FIG. 7.

FIG. 8 shows an exploded view of the four wheeled configuration of FIG. 7, and the battery capacity afforded in the bottom platform, represented by batteries 30. Electric hub motors in wheels 38, 40 are proposed in order to reduce complex power transfer mechanisms for tilting and steering wheels. Electric hub motors would allow all wheels to be powered in either the three or four wheel configuration. While FIGS. 9 and 10 show a multiple rider configuration, whereby both passengers and driver can actively participate in the control of tilt through the use of pressure from legs on the battery storage compartment of the lower bar of the parallelogram. This feature is accomplished by extending the foot platform 22 and the central chassis 12, and allows for greater battery storage capability.

Finally turning to FIGS. 11 and 12 the suspension assembly 10 may be employed with watercraft or snow vehicles. FIG. 11 depicts the suspension assembly 10 of the present invention with travel surface interfaces in the form of skis 50 to allow the vehicle 12 to travel on snow. Similarly, FIG. 12 depicts travel interfaces that are pontoons 52 to support the vehicle 12 on water.

It can therefore be seen that the present invention provides a novel suspension assembly for a tilting vehicle that enhances the stability thereof through the use of improved suspension geometry in connection with a storage compartment that is located in a low position thereby lowering the center of gravity of the overall vehicle. Further, the present invention provides for a suspension assembly and weight distribution for a tilting vehicle that maintains the vehicle's nimble and easy handling characteristics making a practical and fun vehicle to ride. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A suspension system for a tilting vehicle that travels on a surface, comprising:
   a central frame having a front, a rear and a support means for a rider;
   a front suspension arrangement including a continuous top suspension bar and a continuous bottom suspension bar each having a respective left end and right end and a left suspension bar and a right suspension bar each having a respect top end and bottom end wherein said left ends of said top and bottom suspension bars are pivotally attached to said respective top and bottom ends of said left suspension bar and right ends of said top and bottom suspension bars are pivotally attached to said respective top and bottom ends of said right suspension bar such that said top and bottom suspension bars are substantially parallel to one another and said left and right suspension bars are substantially parallel to one another, wherein a central portion of said top and bottom suspension bars are pivotally affixed to the front of the central frame; and
   a storage region created by a rearward extension of said bottom suspension bar,
   wherein tilting of said central frame displaces said top suspension bar relative to said bottom suspension bar causing said left and right suspension bars to tilt at an angle equal to the tilt of the central frame.

2. The suspension system of claim 1, further comprising two front travel surface interfaces affixed to said left and right suspension bars and a third travel surface interface the rear of said central frame.

3. The suspension system of claim 2, wherein said two front travel surface interfaces are pivotally affixed to said left and right suspension bars.

4. The suspension system of claim 2, wherein said travel surface interface is selected from the group consisting of: wheels, skis and pontoons.

5. The suspension system of claim 1, wherein the rider uses their legs to control the tilting of said central frame by exerting a force against one of the top or bottom suspension bars.

6. The suspension system of claim 1, wherein said storage compartment is a battery compartment.

7. The suspension system of claim 1 further comprising:
   a rear suspension arrangement including a top suspension bar and a bottom suspension bar each having a respective left end and right end and a left suspension bar and a right suspension bar each having a respect top end and bottom end wherein said left ends of said top and bottom suspension bars are pivotally attached to said respective top and bottom ends of said left suspension bar and right ends of said top and bottom suspension bars are pivotally attached to said respective top and bottom ends of said right suspension bar such that said top and bottom suspension bars are substantially parallel to one another and said left and right suspension bars are substantially parallel to one another, wherein a central portion of said top and bottom suspension bars are pivotally affixed to the rear of the central frame.

8. The suspension system of claim 7, further comprising two front travel surface interfaces affixed to said left and right suspension bars of said front suspension arrangement and two rear travel surface interfaces affixed to said left and right suspension bars of said rear suspension arrangement.

9. The suspension system of claim 8, wherein said two front travel surface interfaces are pivotally affixed to said left and right suspension bars of said front suspension arrangement.

10. A suspension system for a tilting vehicle that travels on a surface comprising:
    a central frame having a front, a rear and a support means for a rider;
    a rear suspension arrangement including a continuous top suspension bar and a continuous bottom suspension bar each having a respective left end and right end and a left suspension bar and a right suspension bar each having a respect top end and bottom end wherein said left ends of said top and bottom suspension bars are pivotally attached to said respective top and bottom ends of said left suspension bar and right ends of said top and bottom suspension bars are pivotally attached to said respective top and bottom ends of said right suspension bar such that said top and bottom suspension bars are substantially parallel to one another and said left and right suspension bars are substantially parallel to one another, wherein a central portion of said top and bottom suspension bars are pivotally affixed to the rear of the central frame; and
    a storage region created by a forward extension of said bottom suspension bar,
    wherein tilting of said central frame displaces said top suspension bar relative to said bottom suspension bar causing said left and right suspension bars to tilt at an angle equal to the tilt of the central frame.

11. The suspension system of claim 10, further comprising two rear travel surface interfaces affixed to said left and right suspension bars and a third travel surface interface the front of said central frame.

12. The suspension system of claim 11, wherein said third travel surface interface is pivotally affixed to the front of said central frame.

13. The suspension system of claim 11, wherein said two rear travel surface interfaces are pivotally affixed to said left and right suspension bars.

14. The suspension system of claim 11, wherein said travel surface interface is selected from the group consisting of: wheels, skis and pontoons.

15. The suspension system of claim 10, wherein the rider uses their legs to control the tilting of said central frame by exerting a force against one of the top or bottom suspension bars.

16. The suspension system of claim 10, wherein said storage compartment is a battery compartment.

17. The suspension system of claim 16, wherein a battery in said storage compartment powers electric motors positioned within the wheel hubs to drive wheels directly.

* * * * *